(12) United States Patent
Holung et al.

(10) Patent No.: US 8,437,126 B2
(45) Date of Patent: May 7, 2013

(54) SEPARABLE HINGE ASSEMBLY WITH TWO COMPONENT DEVICE

(75) Inventors: Joseph A Holung, Wake Forest, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 301 days.

(21) Appl. No.: 12/943,587

(22) Filed: Nov. 10, 2010

(65) Prior Publication Data

US 2012/0113578 A1 May 10, 2012

(51) Int. Cl.
*H05K 7/16* (2006.01)

(52) U.S. Cl.
USPC ............ 361/679.29; 361/679.27; 361/679.01; 248/917; 16/367

(58) Field of Classification Search ............. 361/679.01, 361/679.02, 679.08, 679.09, 679.21, 679.22, 361/679.26, 679.27, 679.55–679.58, 679.29, 361/679.41; 248/917–924; 16/367; 312/223.1–223.2
See application file for complete search history.

(56) References Cited

U.S. PATENT DOCUMENTS

| | | | | |
|---|---|---|---|---|
| 5,335,142 A * | 8/1994 | Anderson | ................ | 361/679.07 |
| 6,830,456 B2 * | 12/2004 | Obermeyer | ........................ | 439/6 |
| 6,876,545 B2 * | 4/2005 | Tseng et al. | ............. | 361/679.06 |
| 6,952,340 B2 * | 10/2005 | Son et al. | ................. | 361/679.09 |
| 7,130,186 B2 * | 10/2006 | Yu | ............................. | 361/679.27 |
| 2012/0086658 A1 * | 4/2012 | Moradian | ..................... | 345/173 |

\* cited by examiner

*Primary Examiner* — Jinhee Lee
*Assistant Examiner* — Ingrid Wright
(74) *Attorney, Agent, or Firm* — John L. Rogitz; John M. Rogitz

(57) ABSTRACT

A group of assemblies—two housings and a hinge assembly—which particularly enhances the flexibility in use of electronic devices such as computer systems and cell phones. The enhancement derives from the capability of separating the three elements by pairs or one from another for use either individually or as a conjoined entity.

20 Claims, 4 Drawing Sheets

US 8,437,126 B2

SEPARABLE HINGE ASSEMBLY WITH TWO COMPONENT DEVICE

FIELD AND BACKGROUND

What is described here relates to two component electronic devices and to a hinge assembly cooperating with two such components to impart enhanced flexibility in use.

One type of configuration which has been used in the past for electronic devices is known as a "clamshell". Such configurations appear in cell phones, computer system, and other devices. In a typical clamshell configuration, two housings are provided and joined by a hinge which enables pivotal movement of one housing relative to the other on an axis which extends along one side edge of the housings, at which they are joined. In a second type of configuration which has been used, special hinges which secure two housings together enable both pivotal movement on an axis which extends parallel to side edges of the housings but also enables rotational movement of one housing relative to the other about an axis which is perpendicular to the side edges. Such special hinges, seen for example in certain computer systems which have touch sensitive or responsive displays (so-called "touch screens"), permit a housing containing a display to folded over a second housing for the display to either be protected by the other housing or exposed for touching by a user.

SUMMARY

What is here disclosed is a group of assemblies—two housings and a hinge assembly—which particularly enhances the flexibility in use of electronic devices such as those described. The enhancement derives from the capability of separating the three elements by pairs or one from another for use either individually or as a conjoined entity.

BRIEF DESCRIPTION OF DRAWINGS

Some of the purposes of the technology here disclosed having been stated, others will appear as the description proceeds, when taken in connection with the accompanying drawings, in which.

DETAILED DESCRIPTION OF EMBODIMENTS

While the present invention will be described more fully hereinafter with reference to the accompanying drawings, in which a preferred embodiment of the present structures are shown, it is to be understood at the outset of the description which follows that persons of skill in the appropriate arts may modify the technology here described while still achieving the favorable results of the technology. Accordingly, the description which follows is to be understood as being a broad, teaching disclosure directed to persons of skill in the appropriate arts, and not as limiting upon the scope of protection afforded the technology.

The term "circuit" or "circuitry" may appear in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
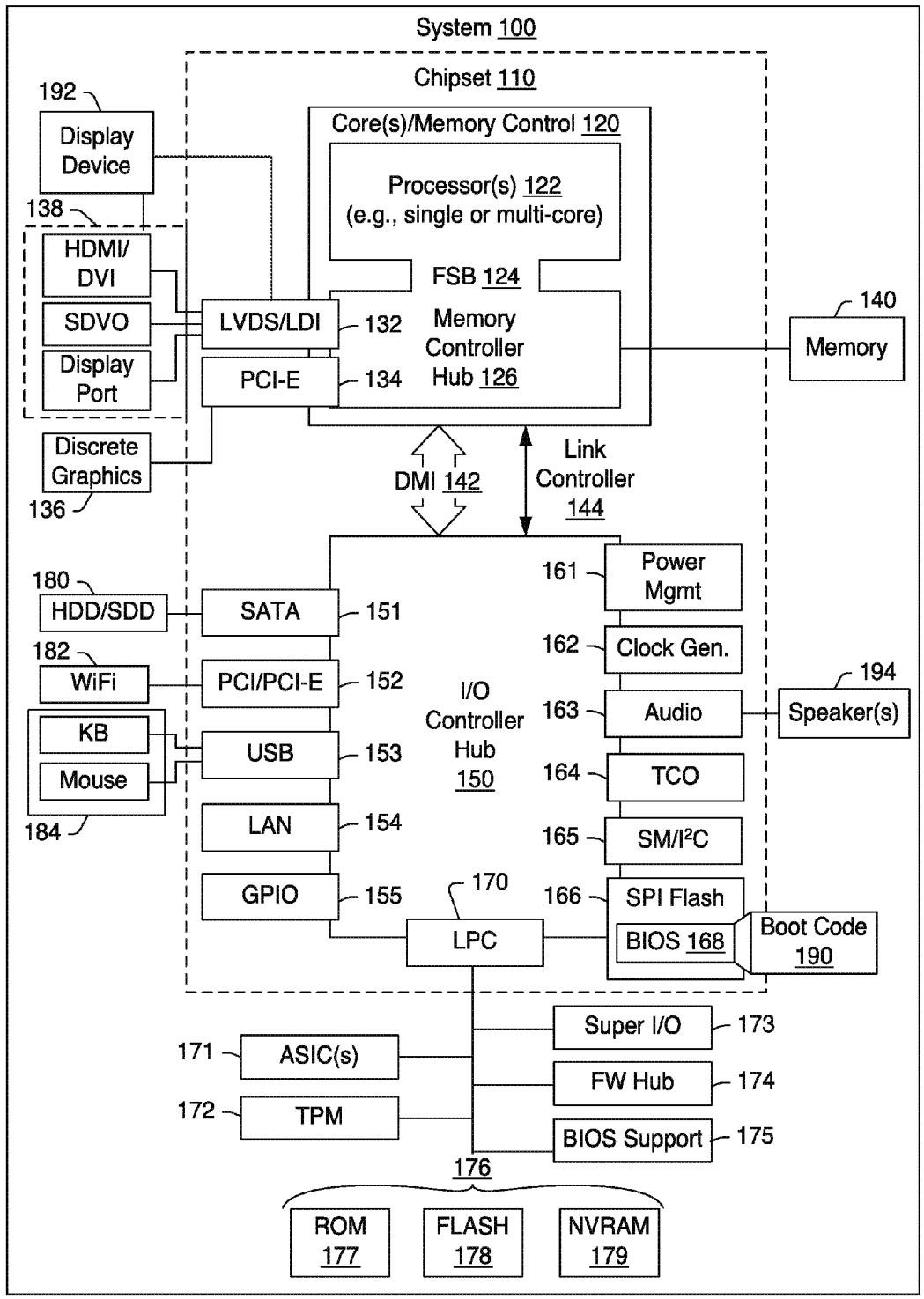
FIG. 1 is a schematic illustration of an electronic device, particularly a computer system.
Figure 2:
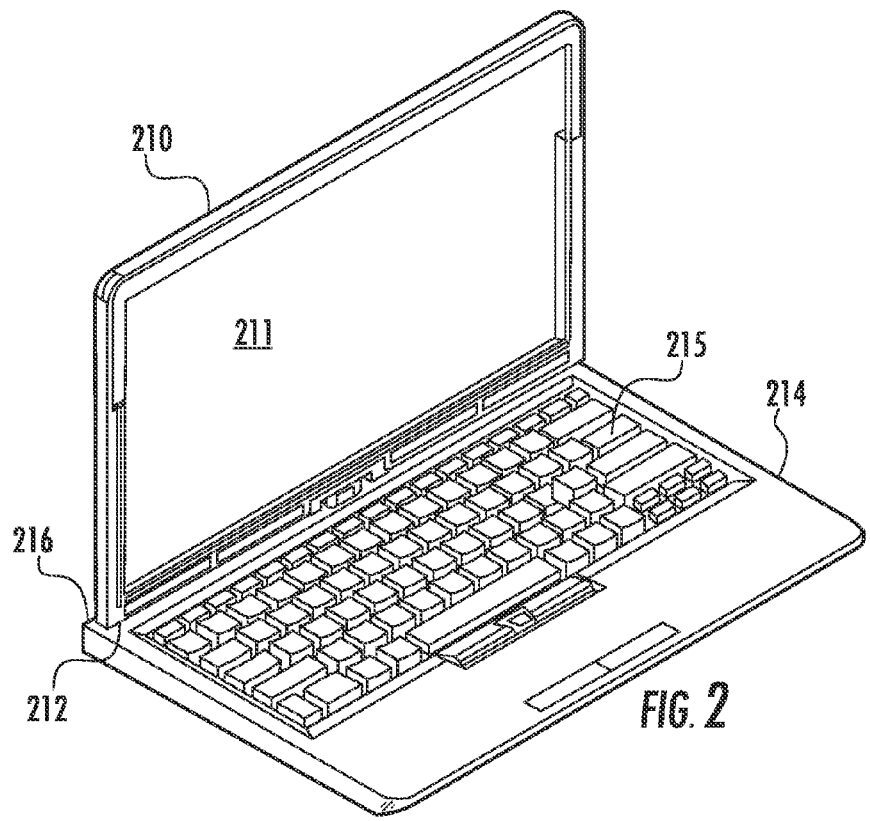
FIGS. 2 and 3 are perspective views, from opposite sides, of an illustrative electronic device having two housings and a hinge assembly as described herein.
Figure 3:
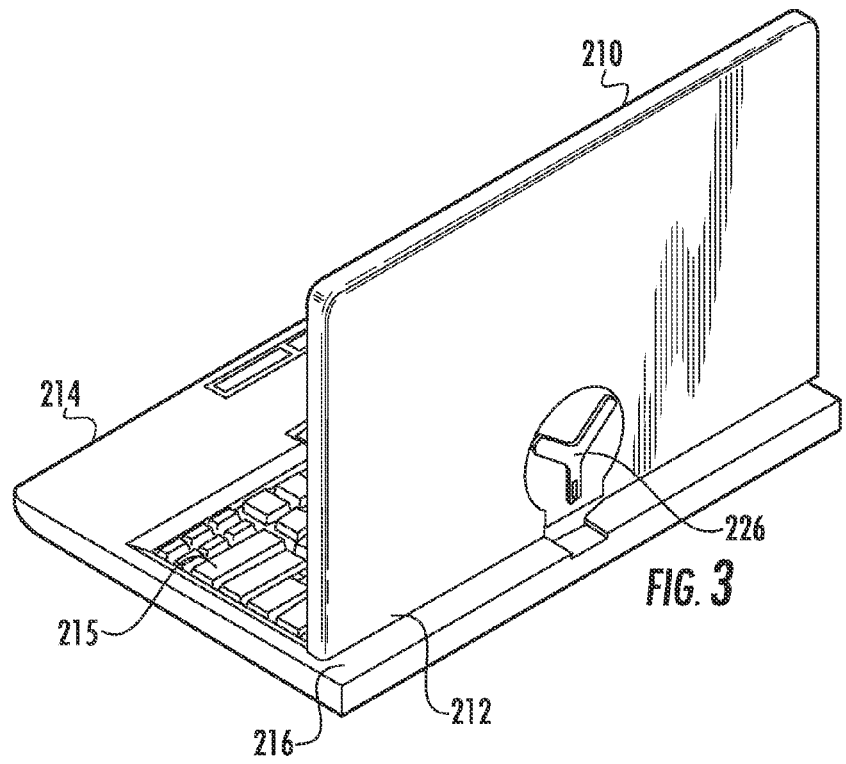

While various exemplary circuits or circuitry are discussed, FIG. 1 depicts a block diagram of an illustrative exemplary computer system 100. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100.

The system 100 of FIG. 1 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

Referring now to FIGS. 2 through 5, the electronic device there shown is a selectively conjoined assembly of three devices. These are a first device housing 210 bearing a display 211 and having a side edge 212; a second device housing 214 bearing a manual input device (shown as a keyboard 215) and having a side edge 216; and a hinge assembly 218 for selectively detachably coupling the first device housing 210 and the second device housing 214. The hinge assembly 218 when coupling the first and second housings together accommodates relative movement therebetween on two orthogonal axes, one of which extends parallel to the side edges 212, 216 and the other extending perpendicularly to that axis. This technology contemplates that movement of the first and second housings 210, 214 about the axis which parallels the side edges 212, 216 accommodates folding of first housing 210 over the second housing 214. This function is similar to the conventional clam shell operation known from notebook computers and certain cell phones. Additionally, the hinge assembly, when the three elements are joined, enables movement of the first and second housings 210, 214 about another axis perpendicular to the side edges to accommodate rotation of the first housing 210 relative to the second housing 214.

The technology here disclosed contemplates that the display 211 will be a touchscreen. Further, the first housing 210 will contain circuitry such as at least some of the elements shown in FIG. 1 (such as a processor and supporting circuit elements) which provide the first device housing 210, display 211, processor and supporting circuit elements with system capabilities independently of the second device.

With that capability, a distinctive characteristic of this technology comes into play. That is the selectively detachable coupling of the elements provided by the hinge assembly 218 and its cooperation with the first and second housings 210, 214. As will be more fully addressed hereinafter, the hinge assembly allows a user to detach the first housing 210 from the hinge assembly 218 and the second housing 214 and use the first housing device as a "slate" computer system. That is, using the touchscreen and the contained circuitry, a user may access computer operating systems, application programs and data stored in or accessible to (for example over a network connection) the device. As used herein, the phrases "system capability" and "system capabilities" refer to such user access and data manipulation.

Referring now to the second housing 214, it is contemplated that a manual input device incorporated there may be a keyboard as illustrated and/or a touch pad which enables cursor manipulation on a display screen. The second housing 214, in addition to the manual input device, may or may not also have system capability by the provision of circuitry such as at least some of the elements shown in FIG. 1 (such as a processor and supporting circuit elements). If such elements and capability are provided, then the device may be used with an external display as a fully functional computer system.

Figure 4:
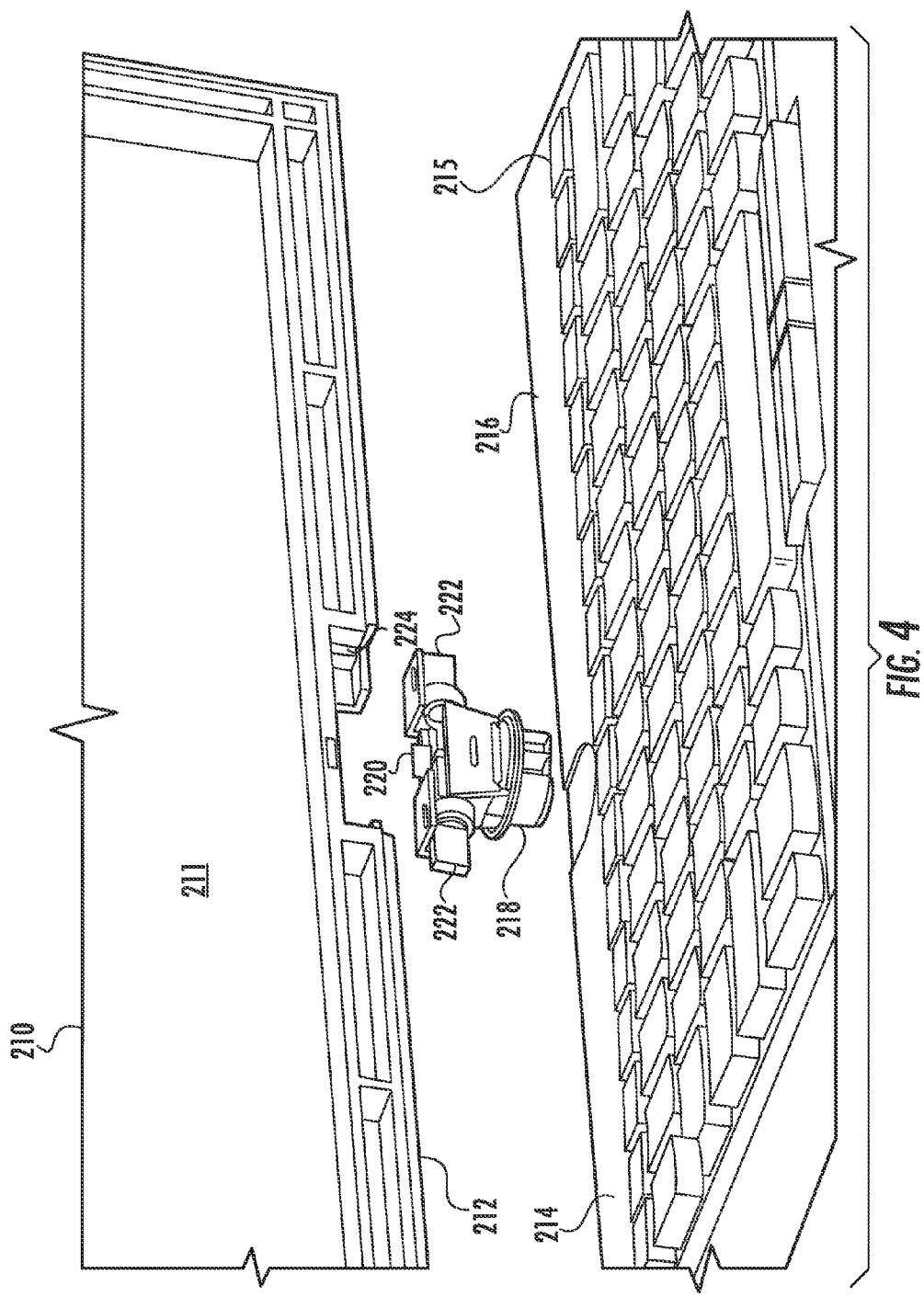
FIG. 4 is a view similar to FIGS. 2 and 3, showing the two housings and hinge assembly separated one from another.

It is to be noted that in FIG. 4, an exploded perspective view, the three elements of this arrangement—two housings and the hinge assembly—are shown separated one from another. What is here described contemplates alternative arrangements. In some implementations, the hinge assembly 218 is selectively separable from each of the two housings. In other implementations, the hinge assembly may be secured in one of the housings for retention there while the housings are separated for use. When conjoined into one super assembly, and with each of the housing elements providing system capability, the processing capability is enhanced above that achieved with either housing element standing alone.

Figure 5:
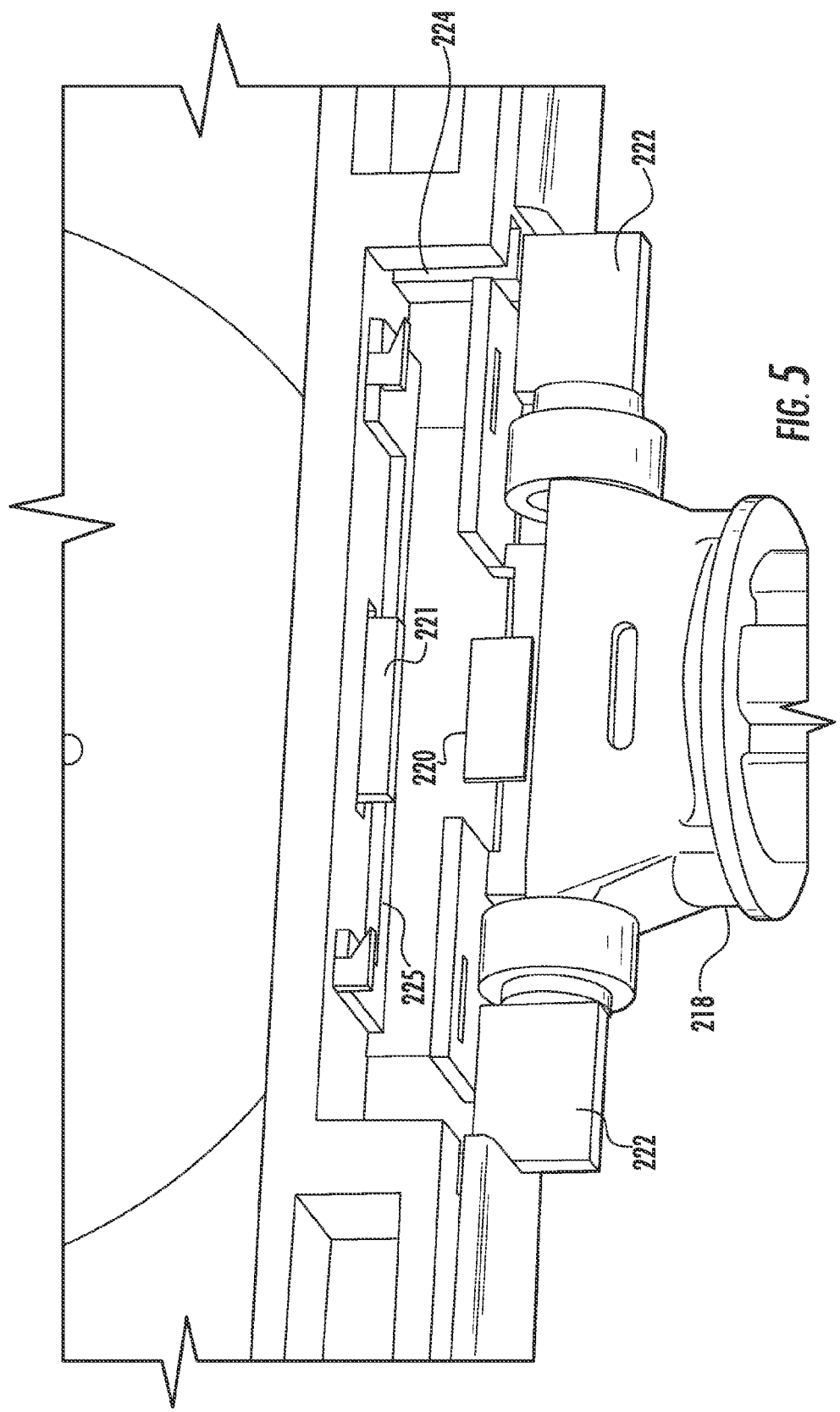
FIG. 5 is a further enlarged perspective view showing details of the hinge assembly and one of the two housings.

Referring now to FIGS. 4 and 5, details of the interconnections among the three elements can be more clearly seen. In the implementation illustrated as an example (others are contemplated), the conjoined assembly has a pair of mating electrical connectors 220, 221, one of the connectors being incorporated in the hinge assembly 218 and the other of the connectors being incorporated in the first device housing 210. While not visible in FIGS. 4 and 5, a similar pair of connectors are provided between the hinge assembly 218 and the second housing 214 where the three elements are to be separable into individual entities. The connectors 220, 221 enable the passage of electrical signals from components housed within one of the two housings to components housed in the other.

It will be noted that the hinge assembly 218 and the first device housing 210 carry a mating set of projecting portions 222 and receiving recesses 224 which align the hinge assembly and first device housing when those elements are moving into coupled relationship. Further, the characteristics of the mating projections and recesses 222, 224 are preferably such that the elements are both guided into engagement and coupled for transmitting any forces necessarily arising with relative movement between the housings as here described.

The mating assemblies 210, 218 are also provided with a suitable latch mechanism for maintaining the coupled relationships in use. In the illustrated implementation (others are contemplated), the latch mechanism between the first housing 210 and the hinge assembly 218 is provided by a slider 225 with tangs which enter into slots provided in the hinge assembly (FIG. 5). The slider may be selectively moved by a user using a rotatable member 226 (FIG. 3) mounted on the rear face of the first housing 210 and coupled to the slider. A bayonet locking collar on the hinge assembly 218 may engage a socket in the second housing 214 in implementations where the three elements are to be completely selectively separable one from the others as described above.

In the drawings and specifications there has been set forth a preferred embodiment of the technology disclosed and, although specific terms are used, the description thus given uses terminology in a generic and descriptive sense only and not for purposes of limitation.

What is claimed is:

1. Apparatus comprising:
   a first computer including a first housing and having a side edge;
   a second computer including a second housing and having a side edge; and
   a hinge assembly including a first end for selectively detachably coupling to a first computer system housing having a side edge and a second end for selectively detachably coupling to second computer system housing having a side edge, said hinge assembly when coupling said first and second housings together accommodating movement therebetween on two orthogonal axes, one of said axes extending parallel to said side edges and the other extending perpendicularly to said one axis;
   wherein the first end includes flanges each with opposing faces, the flanges extending laterally away from the first end of the hinge assembly in opposite directions, the opposite directions both being along an axis that is orthogonal to the hinge assembly, the flanges configured to be slideably disposed in respective recesses in the first housing through respective openings in the side edge such that a first face of each flange contacts a first wall face of the recess when slideably engaged while the opposing second face of each flange contacts a second wall face of the recess when slideably engaged, the flanges being slideable in the respective recesses along an axis parallel to the axis of the hinge assembly; and
   movement of said first and second device housings about said one axis accommodating folding of said first device housing over said second device housing; and
   movement of said first and second device housings about said other axis accommodating rotation of said first device housing relative to said second device housing.

2. The apparatus of claim 1, wherein the processing capabilities of the apparatus when the first and second computers are coupled is greater than the processing capabilities of either the first or second computers alone when detached from each other.

3. The apparatus of claim 1, wherein the second end terminates in an at least partially curved locking collar slideably engagable with a complimentary socket disposed on the second housing to thereby secure the hinge assembly to the second housing.

4. The apparatus of claim 1, wherein the hinge assembly is further configured to include plural latch assembly slots proximate to the first end of the hinge assembly, the slots configured for receiving latching elements of a latch assembly on the first housing, the latching elements each including a first member extending away from the side edge of the first housing along an axis parallel to the axis defined by the hinge assembly such that a proximal end of the first member is engaged with another portion of the latch assembly on the housing and a distal end of the first member bears a second member for engaging one of the slots, the second member extending along an axis generally orthogonal to the axis of the hinge assembly, the slots configured for receiving the latching elements when the latching assembly is in an unlatched configuration and also configured for engaging the latching elements to thereby latch the hinge assembly to the first housing when the latching assembly is in a latched configuration.

5. The apparatus of claim 4, wherein the slots are juxtaposed on respective plates defining a plane that is orthogonal to the axis of the hinge assembly.

6. The apparatus of claim 4, wherein the proximal ends of the first members are engaged with respective ends of a movable bar included on the latch assembly, the movable bar defining an axis orthogonal to the axis defined by the hinge assembly and being mechanically engageable with an angularly rotating element of the latch assembly to move the bar laterally along its axis to cause the second members to securely engage the respective slots when inserted therein to thereby define the latched configuration such that the second members abut a surface of the hinge assembly adjacent to respective slots, the unlatched configuration defined by the bar being positioned such that the latching elements do not abut the surface of the hinge assembly adjacent to the slots but are oriented to enter and retract from the slots, the angularly rotating element being disposed on a surface of the respective housing opposite a surface including a display device.

7. Apparatus comprising:
   a hinge assembly including a first end for selectively detachably coupling to a first computer system housing having a side edge and a second end for selectively detachably coupling to second computer system housing having a side edge, said hinge assembly being configured such that, when coupling said first and second housings together, the hinge assembly accommodates relative movement between the first and second housings on two orthogonal axes, one of said axes extending parallel to said side edges and the other extending perpendicularly to said one axis;
   wherein the first end includes flanges each with opposing faces, the flanges extending laterally away from the first end of the hinge assembly in opposite directions, the opposite directions both being along an axis that is orthogonal to the hinge assembly, the flanges configured to be slideably disposed in respective recesses in the first housing through respective openings in the side edge such that a first face of each flange contacts a first wall face of the recess when slideably engaged while the opposing second face of each flange contacts a second wall face of the recess when slideably engaged, the flanges being slideable in the respective recesses along an axis parallel to the axis of the hinge assembly;
   wherein the second end terminates in an at least partially curved locking collar slideably engagable with a complimentary socket disposed on the second housing to thereby secure the hinge assembly to the second housing
   wherein said hinge assembly accommodates movement of said first and second housings about said one axis such that said first housing is foldable over said second housing; and
   wherein said hinge assembly accommodates movement of said first and second housings about said other axis such that said first housing is rotatable relative to said second housing.

8. Apparatus according to claim 7 further comprising plural latch assembly slots on the hinge assembly proximate to the first end of the hinge assembly, the slots configured for receiving latching elements of a latch assembly on the first housing, the latching elements each including a first member extending away from the side edge of the first housing along an axis parallel to the axis defined by the hinge assembly such that a proximal end of the first member is engaged with another portion of the latch assembly on the housing and a distal end of the first member bears a second member for engaging one of the slots, the second member extending along an axis generally orthogonal to the axis of the hinge assembly, the slots configured for receiving the latching elements when the latching assembly is in an unlatched configuration and configured for engaging the latching elements to thereby latch the hinge assembly to the first housing when the latching assembly is in a latched configuration.

9. The apparatus of claim 8, wherein the proximal ends of the first members are engaged with respective ends of a movable bar included on the latch assembly, the movable bar defining an axis orthogonal to the axis defined by the hinge assembly and being mechanically engageable with an angularly rotating element of the latch assembly to move the bar laterally along its axis to cause the second members to securely engage the respective slots when inserted therein to thereby define the latched configuration such that the second members abut a surface of the hinge assembly adjacent to respective slots, the unlatched configuration defined by the bar being positioned such that the latching elements do not abut the surface of the hinge assembly adjacent to the slots but are oriented to enter and retract from the slots, the angularly rotating element being disposed on a surface of the respective housing opposite a surface including a display device.

10. The apparatus of claim 9, wherein the angularly rotating element is recessed into the surface.

11. The apparatus of claim 8, wherein each second member includes a proximate end connected to the respective first member and a tapered distal end terminating in a point.

12. The apparatus of claim 8, comprising the first and second housings, the latching assembly, and the rotating element.

13. The apparatus of claim 7, wherein the hinge facilitates enhanced processing capabilities of respective first and second computer systems of the first and second housings when combined relative to one of the computer systems alone.

14. A method comprising:
   configuring a first computer housing having a side edge to engage a hinge assembly;
   configuring a second computer housing having a side edge to engage the hinge assembly configuring the hinge assembly to engage the first and second computer housings, wherein the hinge assembly includes a first end for selectively detachably coupling to the first housing and a second end for selectively detachably coupling to the second housing having, said hinge assembly being configured such that, when coupling said first and second housings together, the hinge assembly accommodates relative movement between the first and second housings on two orthogonal axes, one of said axes extending parallel to said side edges and the other extending perpendicularly to said one axis;

wherein the first end includes flanges each with opposing faces, the flanges extending laterally away from the first end of the hinge assembly in opposite directions, the opposite directions both being along an axis that is orthogonal to the hinge assembly, the flanges configured to be slideably disposed in respective recesses in the first housing through respective openings in the side edge such that a first face of each flange contacts a first wall face of the recess when slideably engaged while the opposing second face of each flange contacts a second wall face of the recess when slideably engaged, the flanges being slideable in the respective recesses along an axis parallel to the axis of the hinge assembly;

wherein said hinge assembly accommodates movement of said first and second housings about said one axis such that said first housing is foldable over said second housing; and wherein said hinge assembly accommodates movement of said first and second housings about said other axis such that said first housing is rotatable relative to said second housing.

15. The method of claim 14, wherein the processing capabilities of computing systems in each of the first and second housings is greater when electrically connected to each other through the hinge assembly than the processing capabilities of either the first or second computing systems alone.

16. The method of claim 14, wherein the second end terminates in an at least partially curved locking collar slideably engagable with a complimentary socket disposed on the second housing to thereby secure the hinge assembly to the second housing.

17. The method of claim 14, wherein the hinge assembly is further configured to include plural latch assembly slots proximate to the first end of the hinge assembly, the slots configured for receiving latching elements of a latch assembly on the first housing, the latching elements each including a first member extending away from the side edge of the first housing along an axis parallel to the axis defined by the hinge assembly such that a proximal end of the first member is engaged with another portion of the latch assembly on the housing and a distal end of the first member bears a second member for engaging one of the slots, the second member extending along an axis generally orthogonal to the axis of the hinge assembly, the slots configured for receiving the latching elements when the latching assembly is in an unlatched configuration and also configured for engaging the latching elements to thereby latch the hinge assembly to the first housing when the latching assembly is in a latched configuration.

18. The method of claim 17, wherein the proximal ends of the first members are engaged with respective ends of a movable bar included on the latch assembly, the movable bar defining an axis orthogonal to the axis defined by the hinge assembly and being mechanically engageable with an angularly rotating element of the latch assembly to move the bar laterally along its axis to cause the second members to securely engage the respective slots when inserted therein to thereby define the latched configuration such that the second members abut a surface of the hinge assembly adjacent to respective slots, the unlatched configuration defined by the bar being positioned such that the latching elements do not abut the surface of the hinge assembly adjacent to the slots but are oriented to enter and retract from the slots, the angularly rotating element being disposed on a surface of the respective housing opposite a surface including a display device.

19. The method of claim 18, wherein the angularly rotating element is recessed into the surface.

20. The method of claim 17, wherein each second member includes a proximate end connected to the respective first member and a tapered distal end terminating in a point.

* * * * *